United States Patent

Tonouchi

[11] Patent Number: 6,035,302
[45] Date of Patent: Mar. 7, 2000

[54] SYSTEM FOR RETRIEVING DATABASE WITH DIFFERENT PROGRAM LANGUAGES

[75] Inventor: Toshio Tonouchi, Tokyo, Japan

[73] Assignee: NEC Corporation, Tokyo, Japan

[21] Appl. No.: 09/027,962

[22] Filed: Feb. 23, 1998

[30] Foreign Application Priority Data

Feb. 21, 1997 [JP] Japan .................................. 9-054050

[51] Int. Cl.[7] .................................................. G06F 17/00
[52] U.S. Cl. ............................... 707/102; 707/101; 707/4
[58] Field of Search ............... 707/1–206; 709/220–303; 711/118

[56] References Cited

U.S. PATENT DOCUMENTS

| | | | |
|---|---|---|---|
| 5,713,014 | 1/1998 | Durflinger et al. | 707/102 |
| 5,822,580 | 10/1998 | Leung | 707/103 |
| 5,826,077 | 10/1998 | Blakeley et al. | 707/4 |
| 5,857,182 | 1/1999 | DeMichiel et al. | 707/3 |
| 5,873,093 | 2/1999 | Williamson et al. | 707/103 |
| 5,893,104 | 4/1999 | Srinavasan et al. | 707/102 |

FOREIGN PATENT DOCUMENTS

2-186479  7/1990  Japan .
6-282437  10/1994  Japan .

*Primary Examiner*—Thomas G. Black
*Assistant Examiner*—David Yiuk Jung
*Attorney, Agent, or Firm*—Sughrue, Mion, Zinn, Macpeak & Seas, PLLC

[57] ABSTRACT

When a data manipulation language execution unit (120) executes a data manipulation routine, an object manipulation unit (150) requests a database access unit (170) to make the database access unit retrieve an object in order to obtain the object from a database (180). The object manipulation unit registers the object in an object descriptor table (160) and supplies the object to the data manipulation language execution unit. The data manipulation language execution unit accesses the object in accordance with an object descriptor and an attribute name. The object manipulation unit fetches the object designated with the descriptor from the object descriptor table. The object manipulation unit supplies object to an attribute extraction unit (140). The attribute extraction unit fetches an attribute in accordance with the object. A data conversion unit (130) converts the attribute into a conversion attribute having a format of a data manipulation language and supplies the conversion attribute to the data manipulation language execution unit.

22 Claims, 10 Drawing Sheets

| ENTRY NUMBER | ADDRESS | KEY | REFERENCE FREQUENCY |
|---|---|---|---|
| 31 | — | — | 0 |
| 32 | 0x2ffe | networkId=l@elementId=1 | 2 |

SYSTEM FOR RETRIEVING DATABASE WITH DIFFERENT PROGRAM LANGUAGES

BACKGROUND OF THE INVENTION

This invention relates to a database access system for an object-oriented database, and, more particularly, to a data base access system capable of accessing a database in case where a database implementation language and a data manipulation language are different from each other.

A conventional database access system is disclosed in Japanese Patent Publication (JP-A) Tokkai Hei 6-282437 (282437/1994) and will be referred as a first conventional database access system. The first conventional database access system may be, for example, used on accessing an object-oriented database. When another database accesses an object stored in the object-oriented database, it is necessary to copy data stored in object-oriented database to the other database. The first conventional database access system is an access system of object attributes for obtaining an attribute value with index reference. When an attribute of the object is accessed for the first time, the value of the attribute is obtained with retrieval inasmuch as the layout information of attribute data is uncertain. In the second or after access, the index based on the actual layout information becoming clear in the first access is recorded in an index conversion table storing the correspondence of the conversion index based on the actual layout information to an index based on assumed layout information of attribute data, by a program.

Another conventional database access system is disclosed in Japanese Patent Publication (JP-A) Tokkai Hei 2-186479 (186479/1990) and will be referred as a second conventional database access system. The second conventional database access system is for copying and transferring an object to a distributed database. In the second conventional database access system, a user can easily inquire without considering the difference between the local databases in an inquiry process of a distributed database composed of a plurality of local databases that are separately defined.

It is necessary to copy of an object in a database in case where a data manipulation language and a database implementation language are different from each other because of the conversion from the data structure manipulated by the database implementation language to the data manipulated by the data manipulation language. In a database system where one or more databases are manipulated in different environments such as a distributed database system or a database system where a plurality of program languages manipulates data, it possible to access data in different environments by copying of the object.

As will be described later, a data manipulation routine scarcely accesses all the attributes of an object in each of the first and the second conventional database access system. The data manipulation routine frequently accesses several attributes of the object. However, data conversion of the object is to perform the data conversion of all the attributes of the object. Redundant data conversion is carried out in each of the first and the second conventional database access system. Namely, inefficient database access is carried out in each of the first and the second conventional database access system.

Inasmuch as data conversion of all the attributes is carried out in each of the first and the second conventional database access system, retrieval speed is degraded and system performance is lowered. In addition, the above-mentioned object-oriented database has not only an object to be retrieved from the database but also the object having the same contents in the data type of the data manipulation language. As a result, memory capacity necessary for data manipulation increases in each of the first and the second conventional database access system. The increase of the memory capacity leads to the increase of cost.

SUMMARY OF THE INVENTION

It is therefore an object of this invention to provide a database access system capable of accessing data at a high speed a when data manipulation language is different from a database implementation language.

It is another object of this invention to provide a database access system capable of increasing a memory usage efficiency and reducing cost.

Other objects of this invention will become clear as the description proceeds.

On describing the gist of this invention, it is possible to understand that a database access system comprises a database implementation section of a database implementation language and a data manipulation section of a data manipulation language different from the database implementation language. The database implementation section has a database which is accessed from the data manipulation section.

According to a first aspect of this invention, the data manipulation section comprises first means for specifying an object name as a specific object name in the data manipulation language on accessing a specific one of objects in the database. The database implementation section comprises an object descriptor table for managing object descriptors, second means for retrieving the object descriptor table in accordance with the specific object name in the database implementation language to judge whether or not a specific one of the object descriptors exists in the object descriptor table, third means for supplying the specific object descriptor to the data manipulation section when the specific object descriptor exists in the object descriptor table, and fourth means for retrieving the database in accordance with the specific object name to obtain a specific object from the database when the specific object descriptor does not exist in the object descriptor table, the fourth means registering information of the specific object as the specific object descriptor and supplying the specific object descriptor to the data manipulation section.

According to a second aspect of this invention, the data manipulation section comprises first means for specifying a specific object name as a specific object descriptor in the data manipulation language on obtaining an attribute vale of a specific object in the database as a specific attribute value. The database implementation section comprises an object descriptor table for managing object descriptors, second means for retrieving the object descriptor table in accordance with the specific object descriptor in the database implementation language to obtain the specific object from the database, and third means for supplying the data manipulation section with the specific attribute value in correspondence to the specific object.

According to a third aspect of this invention, the data manipulation section comprises execution means for executing a routine of the manipulation language that is for obtaining a specific attribute value of the specific object, the execution means producing an object descriptor and an attribute name, and conversion means supplied with the object descriptor and the attribute name for carrying out interconversion between the data manipulation language and the database implementation language to produce a converted object descriptor and a converted attribute name each of which has the database implementation language. The database implementation section comprises an object descriptor table for managing object descriptors, object manipulation means for retrieving the object descriptor table in response to the converted object descriptor as a key to obtain location information of the specific object, database access means for accessing the database in accordance with the location information to obtain the specific object from the database that is registered in a location representative of the location information, and extraction means supplied with the specific object for extracting the specific attribute value as an extracted attribute value from the specific object on the basis of the converted attribute name. The conversion means converts the extracted attribute value having the data manipulation language into a conversion attribute value to supply the conversion attribute value to the execution means.

According to a fourth aspect of this invention, the data manipulation section comprises an object descriptor table for managing object descriptors, execution means for executing a routine of the manipulation language that is for accessing a specific object in the database, the execution means producing an object name, and conversion means supplied with the object name for carrying out interconversion between the data manipulation language and the database implementation language to produce a converted object name as a key having the database implementation language. The database implementation section comprises an object descriptor table for managing object descriptors, object manipulation means for retrieving the object descriptor table in response to the key to obtain an entry number of the key as an object descriptor when the key is registered in the object descriptor table, and database access means for retrieving the database in response to the key to obtain a location information of a specific object corresponding to the key when the key is not registered in the object descriptor table, the object manipulation means registering the location information in the object descriptor table. The conversion means converts the object descriptor into a conversion object descriptor having the data manipulation language to supply the conversion object descriptor to the execution means.

According to a fifth aspect of this invention, a medium for recording a program comprises the steps of executing a routine of the manipulation language that is for obtaining a specific attribute value of the specific object, producing an object descriptor and an attribute name, carrying out interconversion between the data manipulation language and the database implementation language to produce a converted object descriptor and a converted attribute name each of which has the database implementation language, retrieving the object descriptor table in response to the converted object descriptor as a key to obtain location information of the specific object, accessing the database in accordance with the location information to obtain the specific object from the database that is registered in a location representative of the location information, extracting the specific attribute value as an extracted attribute value from the specific object on the basis of the converted attribute name, and converting the extracted attribute value into a conversion attribute value having the data manipulation language.

According to sixth aspect of this invention, a medium for recording a program comprises the steps of executing a routine of the manipulation language that is for accessing a specific object in the database, producing an object name, carrying out interconversion between the data manipulation language and the database implementation language to produce a converted object name as a key having the database implementation language, retrieving the object descriptor table in response to the key to obtain an entry number of the key as an object descriptor when the key is registered in the object descriptor table, retrieving the database in response to the key to obtain a location information of a specific object corresponding to the key when the key is not registered in the object descriptor table; registering the location information in the object descriptor table; and converting the object descriptor into a conversion object descriptor having the data manipulation language.

DESCRIPTION OF THE PREFERRED EMBODIMENTS

Figure 1:
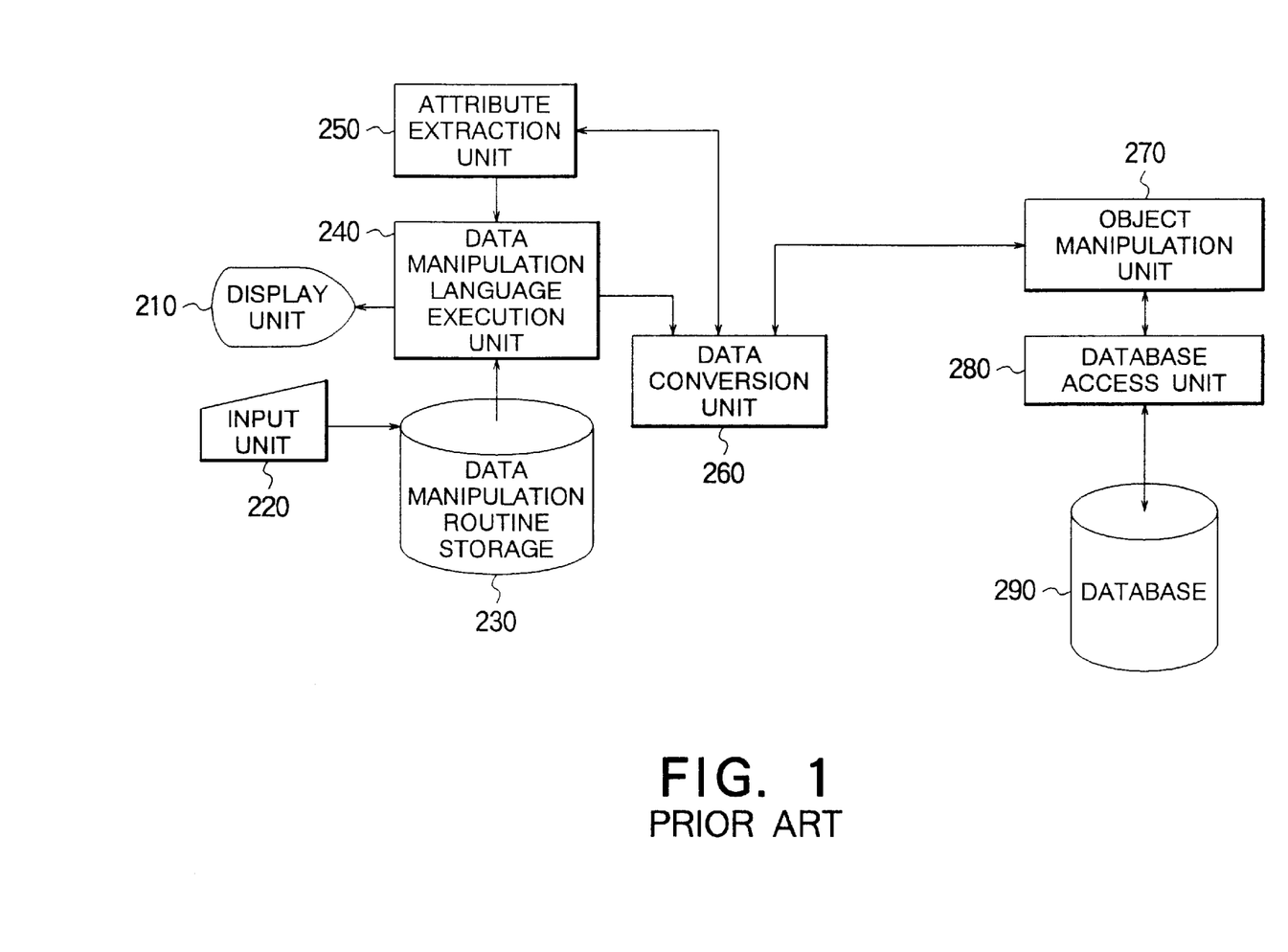
FIG. 1 is a block diagram of a conventional database access system.

Referring to FIG. 1, a conventional database access system will be described at first in order to facilitate an understanding of this invention. In a object-oriented database illustrated in FIG. 1, a user registers a data manipulation routine in a data manipulation routine storage 230 from an input unit 220. The data manipulation routine is written in a data manipulation language. A data manipulation language execution unit 240 fetches the data manipulation routine from the data manipulation routine storage 230 to execute the data manipulation routine, in order to obtain a routine result based on the data manipulation routine. The data manipulation language execution unit 240 outputs the routine result to a display unit 210.

The data manipulation language execution unit 240 accesses a database 290 through an attribute extraction unit 250 to obtain an object. More particularly, the data manipulation language execution unit 240 accesses the database 290 through a data conversion unit 260, an object manipulation unit 270, and a database access unit 280 to obtain the object. Thus, the database access unit 280 accesses the database 290 on the basis of a request of the object manipulation unit 270.

It will be assumed that the object obtained by the object manipulation unit 270 is described in a data type of the database implementation language and will be called a database implementation object. The data conversion unit 260 converts the database implementation object into an object described in a data type of the data manipulation language. The object described in the data type of the data manipulation language will be called a data manipulation object. With reference to the data manipulation object, the attribute extraction unit 250 obtains an attribute designated with an attribute name.

Figure 2:
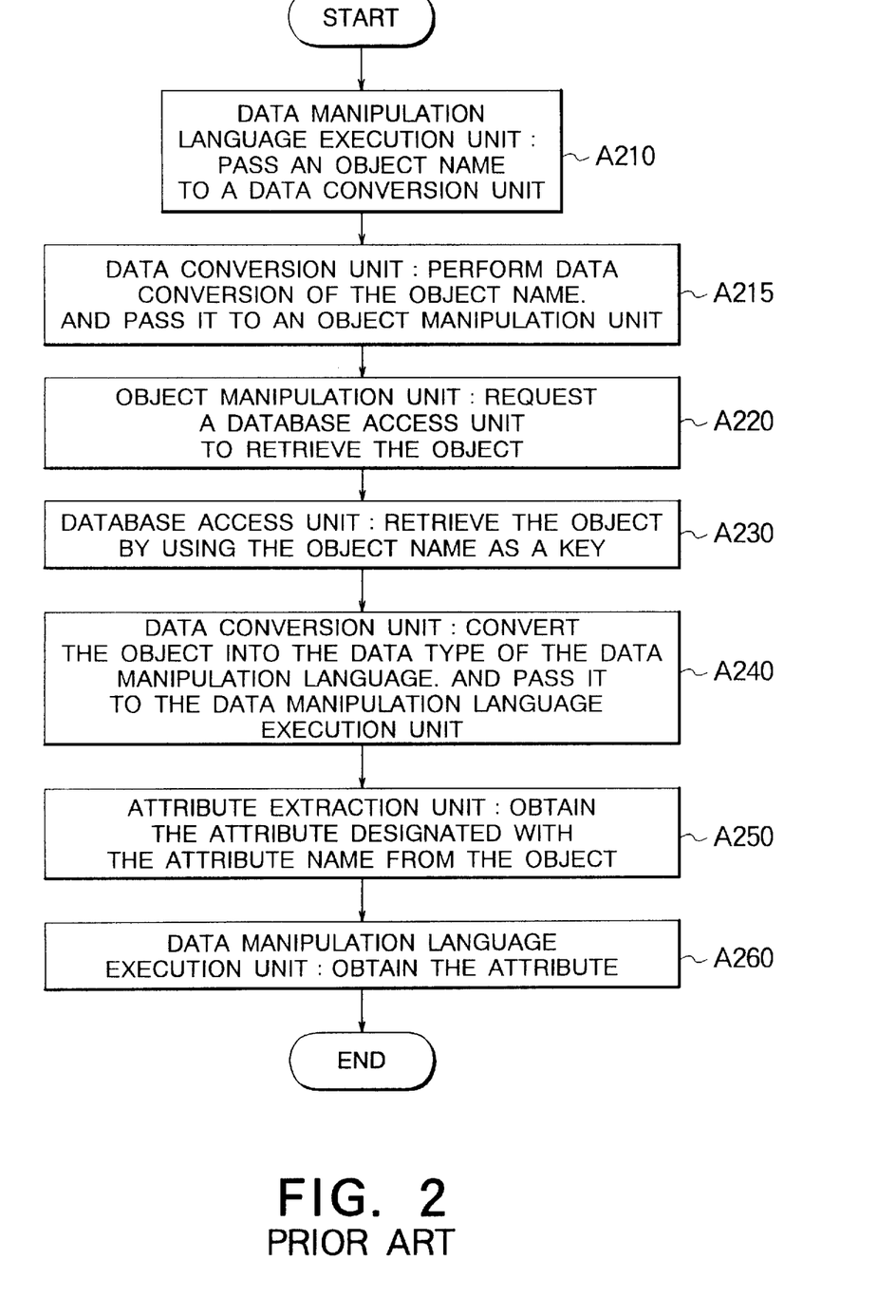
FIG. 2 is a flow chart for describing a process flow of the conventional database access system illustrated in FIG. 1.

Referring to FIG. 2 together with FIG. 1, the data manipulation language execution unit 240 fetches the data manipulation routine from the data manipulation routine storage 230 to execute the data manipulation routine, as described above. It will be assume that there is an attribute access with using an object name, for example, "networkId=1@elementId=1" and an attribute name, for example, "administrative State" as keys. The data manipulation language execution unit 240 supplies the object name of "networkId=1@elementId=1" to the data conversion unit 260 at a first step A210. The data conversion unit 260 converts the object name into an object name of the database implementation language that will be called a database implementation object name. The data conversion unit 260 supplies the database implementation object name to the object manipulation unit 270 at a second step A215.

Supplied with the database implementation object name, the object manipulation unit 270 requests the database access unit 280 to retrieve the database implementation object from the database 290 a third step A220. In response to the request of the object manipulation unit 270, the database access unit 280 obtains the database implementation object corresponding to the database implementation object name in the database 290 a fourth step A230. The data conversion unit 260 converts the database implementation object into the data manipulation object at a fifth step 240. From the data manipulation object, the attribute extraction unit 250 obtains the attribute designated with the attribute name at a sixth step A250. The data manipulation language execution unit 240 receives the attribute from the attribute extraction unit 250 to output the attribute to the display unit 210 at a seventh step 260.

As readily understood from the above mentioned description, the data manipulation routine scarcely accesses all the attributes of an object in the conventional database access system. The data manipulation routine frequently accesses several attributes of the object. However, data conversion of the object is to perform the data conversion of all the attributes of the object. Redundant data conversion is carried out in the conventional database access system. Namely, inefficient database access is carried out in the conventional database access system.

Inasmuch as data conversion of all the attributes is carried out in the conventional database access system, retrieval speed is degraded and system performance is lowered.

In addition, the above-mentioned object-oriented database has not only an object to be retrieved from the database but also the object having the same contents in the data type of the data manipulation language. As a result, memory capacity necessary for data manipulation increases in the conventional database access system. The increase of the memory capacity leads to increase of cost.

Figure 3:
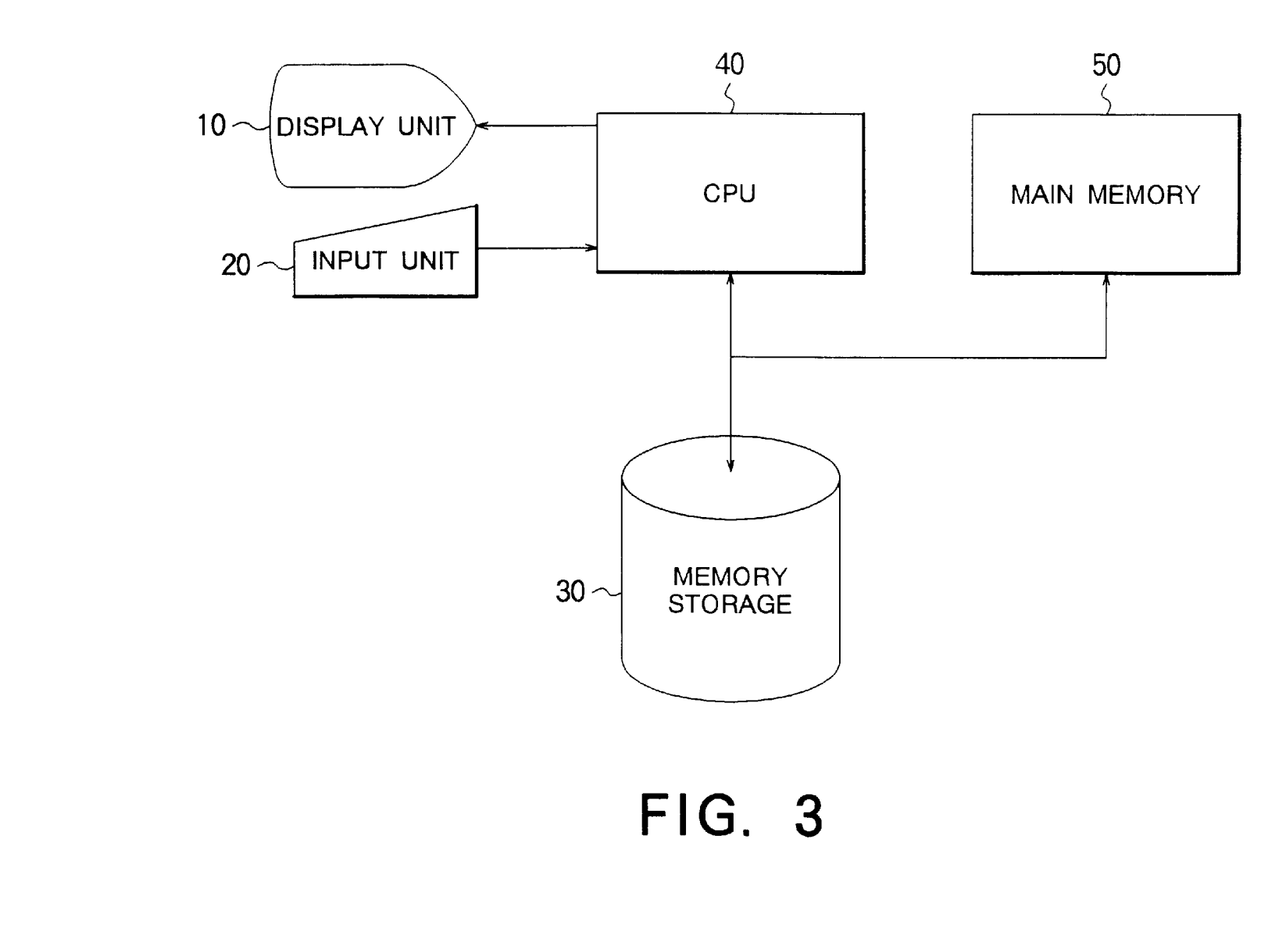
FIG. 3 is a block diagram for illustrating a device configuration to which a database access system according to a first embodiment of this invention is applicable.

Referring to FIG. 3, description will proceed to a database access system according to a first embodiment of this invention. A device configuration to which the database access system is applicable comprises a display unit 10, an input unit 20, a memory storage 30, a central processing unit (CPU) 40, and a main memory unit 50. A user instructs the CPU 40 and obtains information from the CPU 40 via the input unit 20 and the display unit 10. The CPU 40 is for storing and fetching an object into/from the memory storage 30 that is used as a storage unit of a database and a data manipulation routine. The CPU 40 uses the main memory 50 as a work area on accessing the database.

Figure 4:
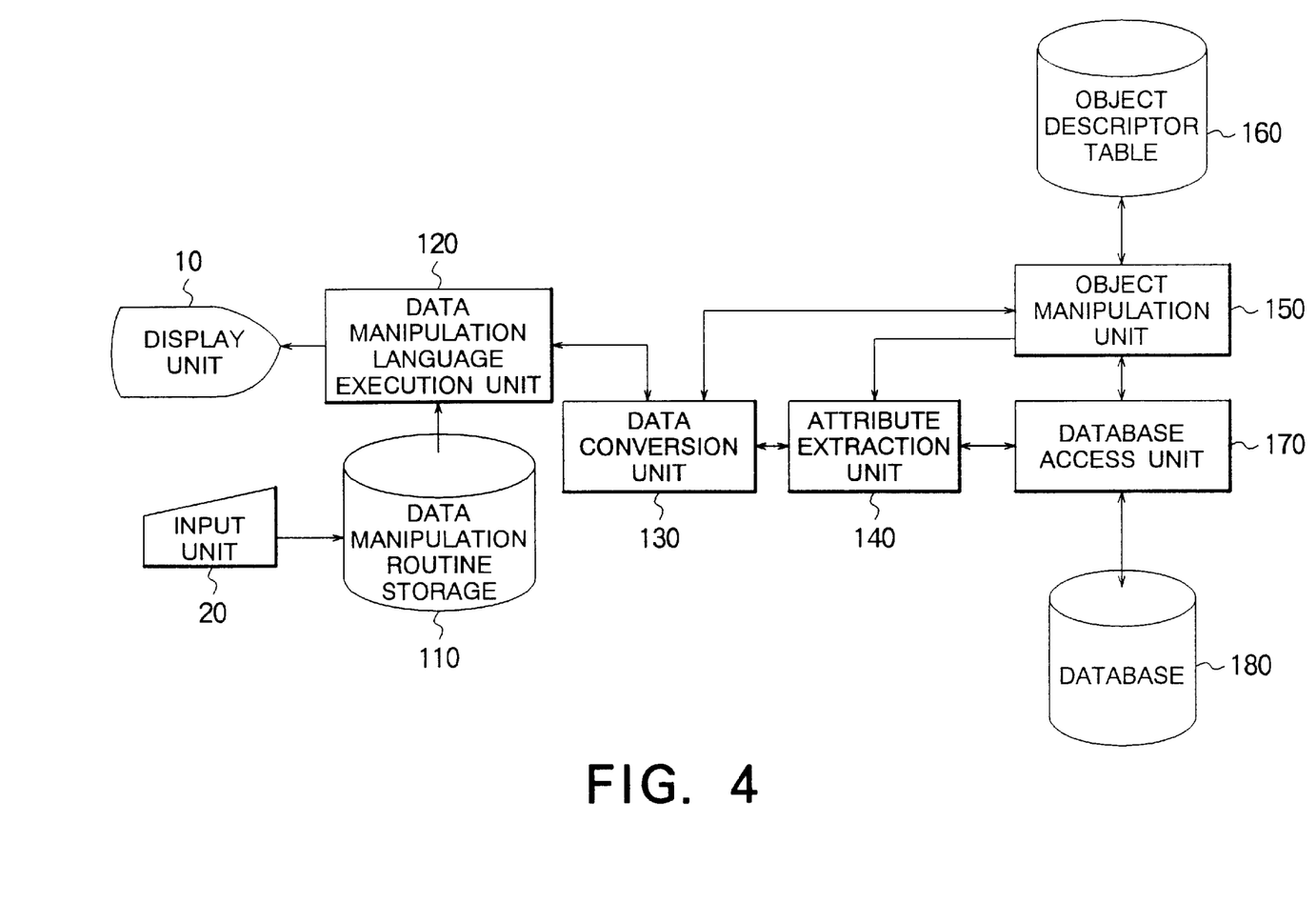
FIG. 4 is a block diagram of the database access system according to the first embodiment of this invention.

Referring to FIG. 4 together with FIG. 3, the database access system comprises a data manipulation routine storage 110, a data manipulation language execution unit 120, a data conversion unit 130, an attribute extraction unit 140, an object manipulation unit 150, an object descriptor table 160, a database access unit 170, and a database 180. The user writes a data manipulation routine through the input unit 20 in the data manipulation routine storage 110. Each of the data manipulation language execution unit 120, the data conversion unit 130, an attribute extraction unit 140, the object manipulation unit 150, the database access unit is produced in the CPU 40 illustrated in FIG. 3. The data manipulation routine storage 110 is implemented as a part of the memory storage 30 illustrated in FIG. 3. The object descriptor table 160 and the database 180 is stored in the memory storage 30 illustrated in FIG. 3.

The data manipulation language execution unit 120 reads or fetches the data manipulation routine out of the data manipulation routine storage 110 to execute the data manipulation routine. The data manipulation routine is written with the data manipulation language. The database 180 stores objects in the data type of the database implementation language. An object of the data type of the database implementation language will be a database implementation object.

As well known in the art, data of data manipulation language is different from data of the database implementation language. The data manipulation language execution unit 120 manipulates the data of the data manipulation language. The data of the data manipulation language are stored in the main memory 50. The data manipulation language execution unit 120 carries out processing with accessing the main memory 50. The result of the processing is outputted to the display unit 10 in order to exhibit the result to the user.

The data conversion unit 130 interconverts the data of the data manipulation language and the data of the database implementation language. In General, the conversion processing greatly affects the database access speed inasmuch as the load of conversion processing is large. The data conversion unit 130 carries out conversions of an attribute, an object, and an object name and attribute name for database access.

The attribute extraction unit 140 extracts, as an extracted attribute, an attribute designated with an attribute name from an object written in the database implementation language. The extracted attribute is described in the database implementation language. The object descriptor table 160 is a table storing addresses of objects in the database 180, object names, and counts representative of reference frequencies, as shown in FIG. 5.

Figure 5:
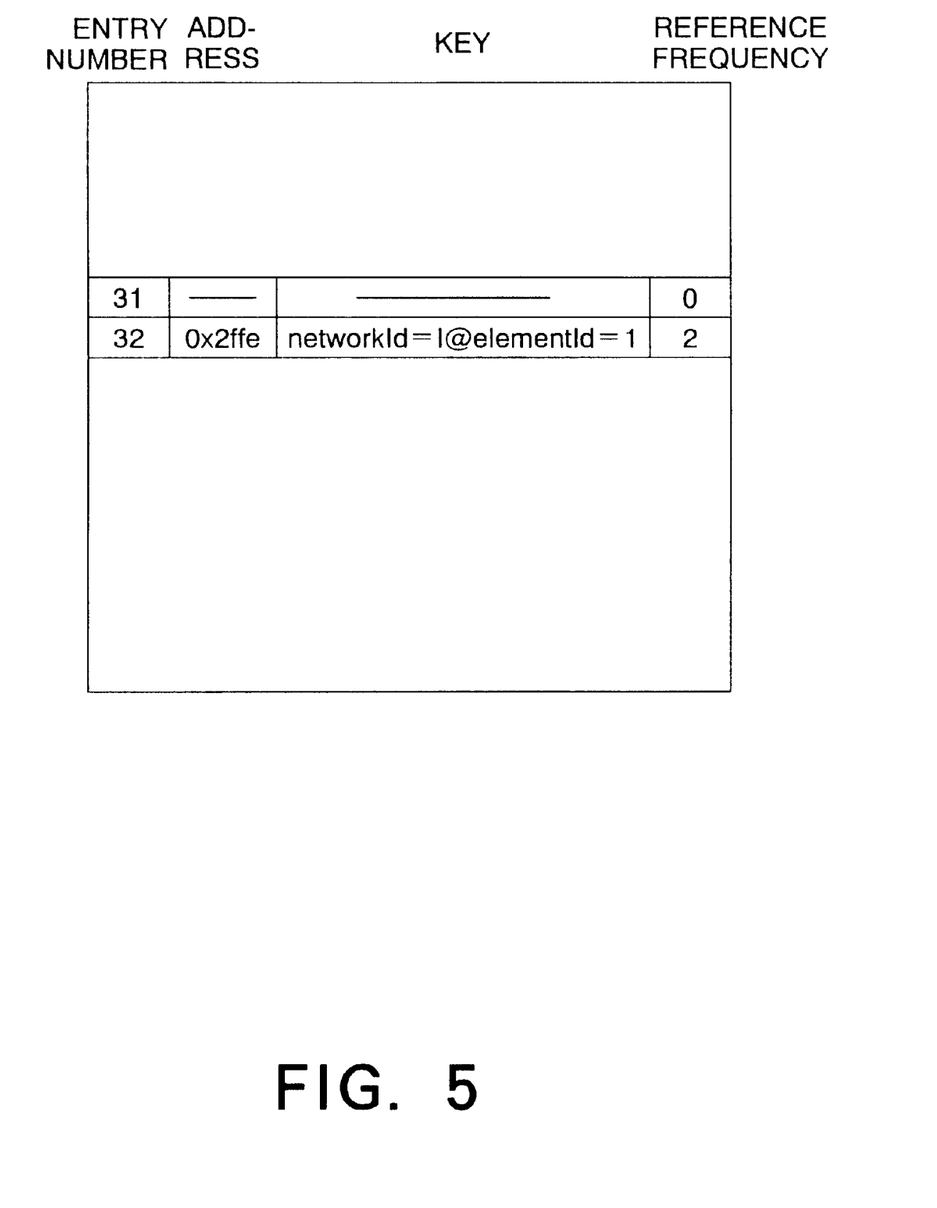
FIG. 5 is a view for illustrating an object descriptor table used in the database access system illustrated in FIG. 4.

Referring to FIG. 5, the object name is used as a key for retrieving an object from the database 180. The address is representative of a position of the object in the database 180. A value in a reference frequency field is a number representative of how many processes have referred the object. In case where the reference frequency is zero, it means that the corresponding object is not used by any processes (users). In this case, the entry is manipulated as a blank field. Each entry has a unique entry number. This entry number will be called an "object descriptor." The object descriptor has one-to-one correspondence to the object.

Again referring to FIG. 4, the object manipulation unit 150 registers an object into the object descriptor table 160 and deletes an object from the object descriptor table 160 in accordance with the instruction of the user. Supplied with an object name, the object manipulation unit 150 first searches the object descriptor table 160 in response to the object name. In case where the object having the object name has been already registered as a registered object in the object descriptor table 160, the object manipulation unit 150 returns the object descriptor to the data conversion unit 130. In case where the object having the object name is not registered as the registered object in the object descriptor table 160, the object manipulation unit 150 controls the database access unit 170 to make the database access unit 170 retrieve the object from the database 180, in order to obtain the object as retrieval object from the database 180. The object manipulation unit 150 registers the retrieval object in the object descriptor table 160. More specifically, the object manipulation unit 150 registers the positional information of the retrieval object in the address field of the object descriptor table 160. Furthermore, the object manipulation unit 150 uses the object descriptor as a key to retrieve the corresponding object from the object descriptor table 160.

As described above, the database access unit 170 fetches an object from the database 180 and changes an attribute value of the object in accordance with the requests from the object manipulation unit 150 and the attribute extraction unit 140.

Figure 6:
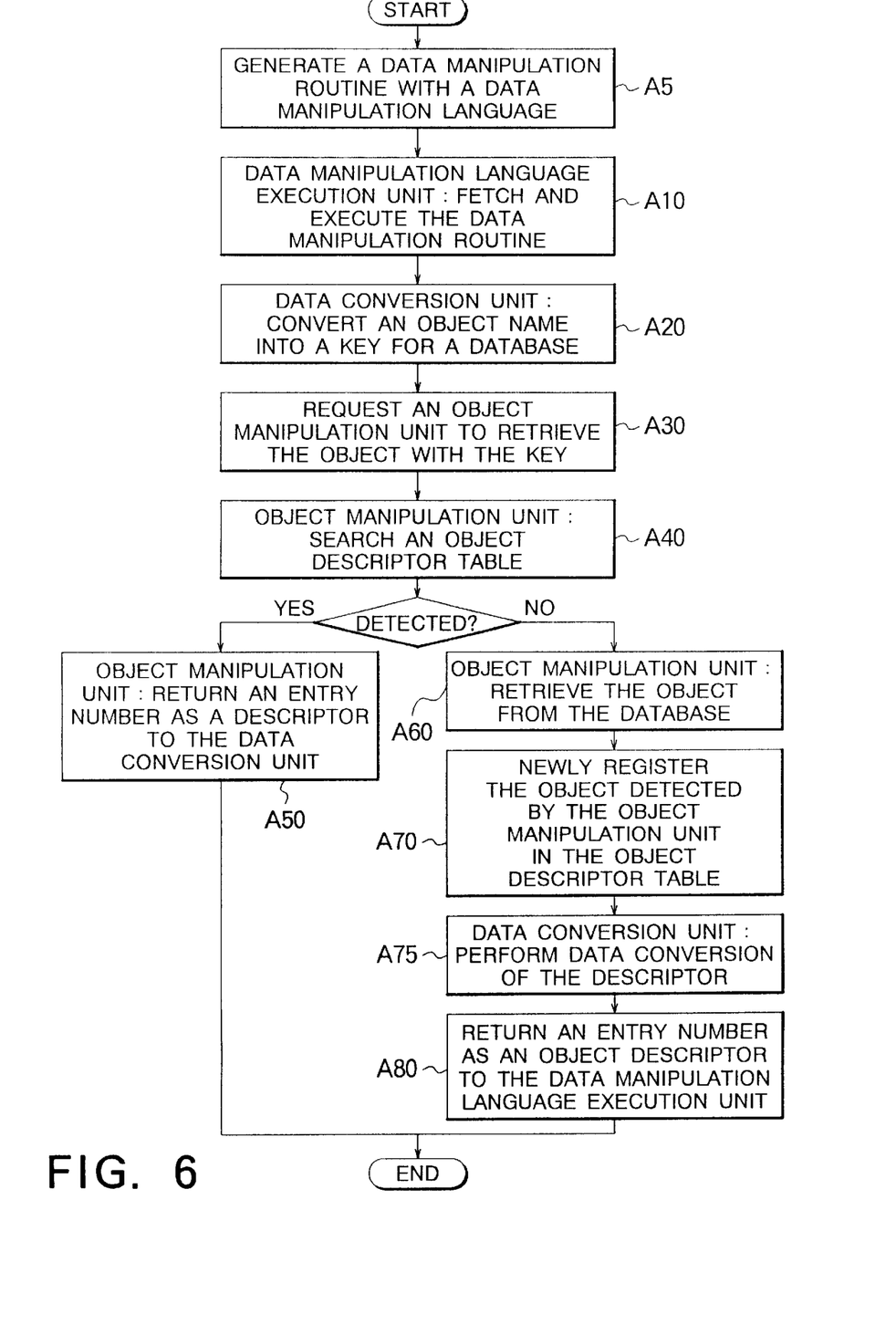
FIG. 6 is a flow chart for describing a process flow for registering an object stored in a database in the object descriptor table.

Referring to FIG. 6 in addition to FIG. 4, it is necessary to access an object in order to access an attribute of data in an object-oriented database. A user creates the data manipulation routine describing access of the object by the data manipulation language. The data manipulation routine is registered in the data manipulation routine storage 110 at a first step A5. The data manipulation language execution unit 120 fetches the data manipulation routine from the data manipulation routine storage 110 to execute the data manipulation routine at a second step A10. After accessing the object, the data manipulation language execution unit 120 supplies the data conversion unit 130 with the object name designating the object, for example, "networkId=1@elementId=1". The data conversion unit 130 converts the object name into the database implementation object name having the database implementation language at a third step A20. The database implementation object name is used as a retrieval key for accessing the object in the database 180. The data conversion unit 130 supplies the object manipulation unit 150 with the database implementation object name at a fourth step A30.

In response to the retrieval key, the object manipulation unit 150 retrieves the object descriptor table 160 to check whether or not the object designated with the retrieval key is registered in the object descriptor table 160 at a fifth step A40. When the object is registered in the object descriptor table 160, the object manipulation unit 150 supplies the data conversion unit 130 with an entry number of the object, for example, "32" as an object descriptor at a sixth step A50. At that time, the object manipulation unit 150 adds the reference count of the entry number "32" to "1" (referring to a reference frequency field shown in FIG. 3). This means that the number of users (or processes) referring to the entry number "32" counts one up. When the object is registered in the object descriptor table 160 at the fifth step A40, the object manipulation unit 150 requests the database access unit 170 to make database access unit 170 retrieve the database 180 in accordance with the retrieval key at a seventh step A60. At the seventh step A60, it will be assumed that the object manipulation unit 150 obtains an address of the object that is representative of "0x2ffe".

The object manipulation unit 150 registers the object address "0x2ffe" and the object name "networkId=1@elementId=1" in an empty entry of the object descriptor table 160 at a eighth step A70. The empty entry may have an entry number "31" in FIG. 3. Furthermore, the reference count (the value of the reference frequency field of the object descriptor table shown in FIG. 3) is set to "1". This means that there is one user having the object descriptor "31." The object manipulation unit 150 supplies the data conversion unit 130 with a new registered entry number "31" as the object descriptor. The data conversion unit 130 converts the object descriptor into a converted object descriptor having the data manipulation language at a ninth step A75. The data conversion unit 130 supplies the converted object descriptor to the data manipulation language execution unit 120 at a tenth step A80. At the tenth step A80, the data conversion unit 130 supplies data manipulation language execution unit 120 with the object descriptor which is an integer having one-to-one correspondence to an object.

As a result, it is possible to reduce a cost for transfer from the object manipulation unit 150 to the data manipulation language execution unit 120. In addition, it is possible to omit the conversion from the database implementation language to the data manipulation language. By the way, the user wants to have an attribute value instead of the object itself. Therefore, it is unnecessary to carry out a data conversion of the object on accessing the object. As will be described later, cost for conversion is reduced inasmuch as the attribute is converted on accessing the attribute.

Figure 7:
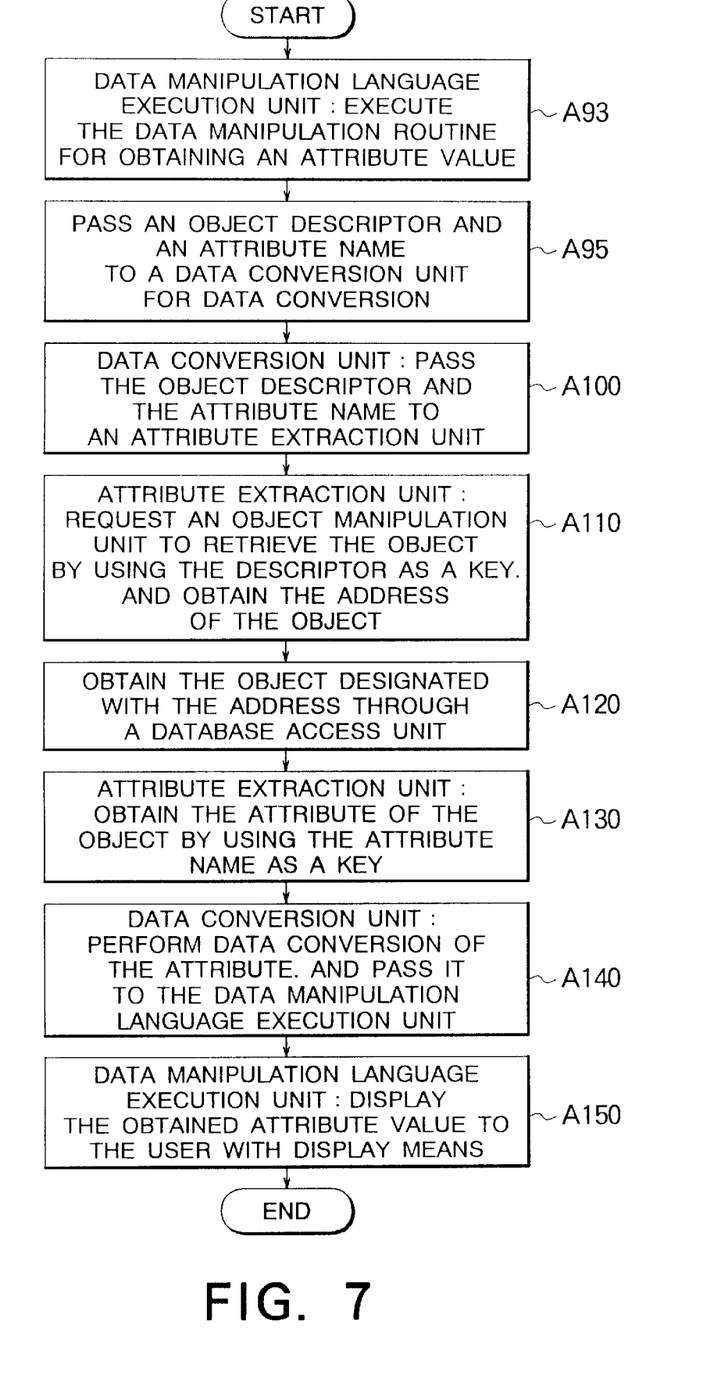
FIG. 7 is a flow chart for describing a process flow for obtaining an attribute value of an object registered in the object descriptor table.

Referring to FIG. 7 together with FIG. 4, it will be assumed that the data manipulation routine is for obtaining an attribute name designated with the object descriptor (entry number) "32". The attribute name may be representative of "administrative State". The data manipulation language execution unit 120 executes the data manipulation routine at an eleventh step A93. The data manipulation language execution unit 120 supplies the data conversion unit 130 with the object descriptor "32" and the attribute name "administrative State". The data conversion unit 130 converts the object descriptor "32" into a converted object descriptor having the database implementation language at a twelfth step A95. Similarly, the data conversion unit 130 converts the attribute name "administrative State" into a converted attribute name having the database implementation language at the twelfth step A95. The data conversion unit 130 supplies the attribute extraction unit 140 with the converted object descriptor "32" and the converted attribute name "administrative State" at a thirteenth step A100.

The attribute extraction unit 140 requests the object manipulation unit 150 to make the object manipulation unit 150 retrieve the object descriptor table 160 on the basis of the object descriptor "32" which is used as a key. As a result of retrieval, the attribute extraction unit 140 obtains the address "ox2ffe" of the object at a fourteenth step A110.

As readily understood from the above description, it is possible to carry out the above-mentioned process at a high speed inasmuch as the object descriptor is the entry number in the object manipulation unit 150.

The attribute extraction unit 140 requests the database access unit 170 in order to obtain the attribute of the object having the address "0x2ffe" at a fifteenth step step A120.

Inasmuch as the retrieval process is carried out in accordance with the address of the object, it is possible to carry out the retrieval at a high speed in comparison with the retrieval using an object name as a key.

Using the attribute name "administrative State" as a key, the attribute extraction unit 140 obtains an attribute value as an obtained attribute value from the object at a sixteenth step A130. The obtained attribute value may be, for example, "locked". The obtained attribute value has the database implementation language. The attribute extraction unit 140 converts the obtained attribute value "locked" into a converted attribute value having the data manipulation language. The attribute extraction unit 140 supplies the converted attribute value to the data manipulation language execution unit 120 at a seventeenth step A140. The data manipulation language execution unit 120 displays the converted attribute value "locked" on the display unit 10 at a eighteenth step A150.

Figure 8:
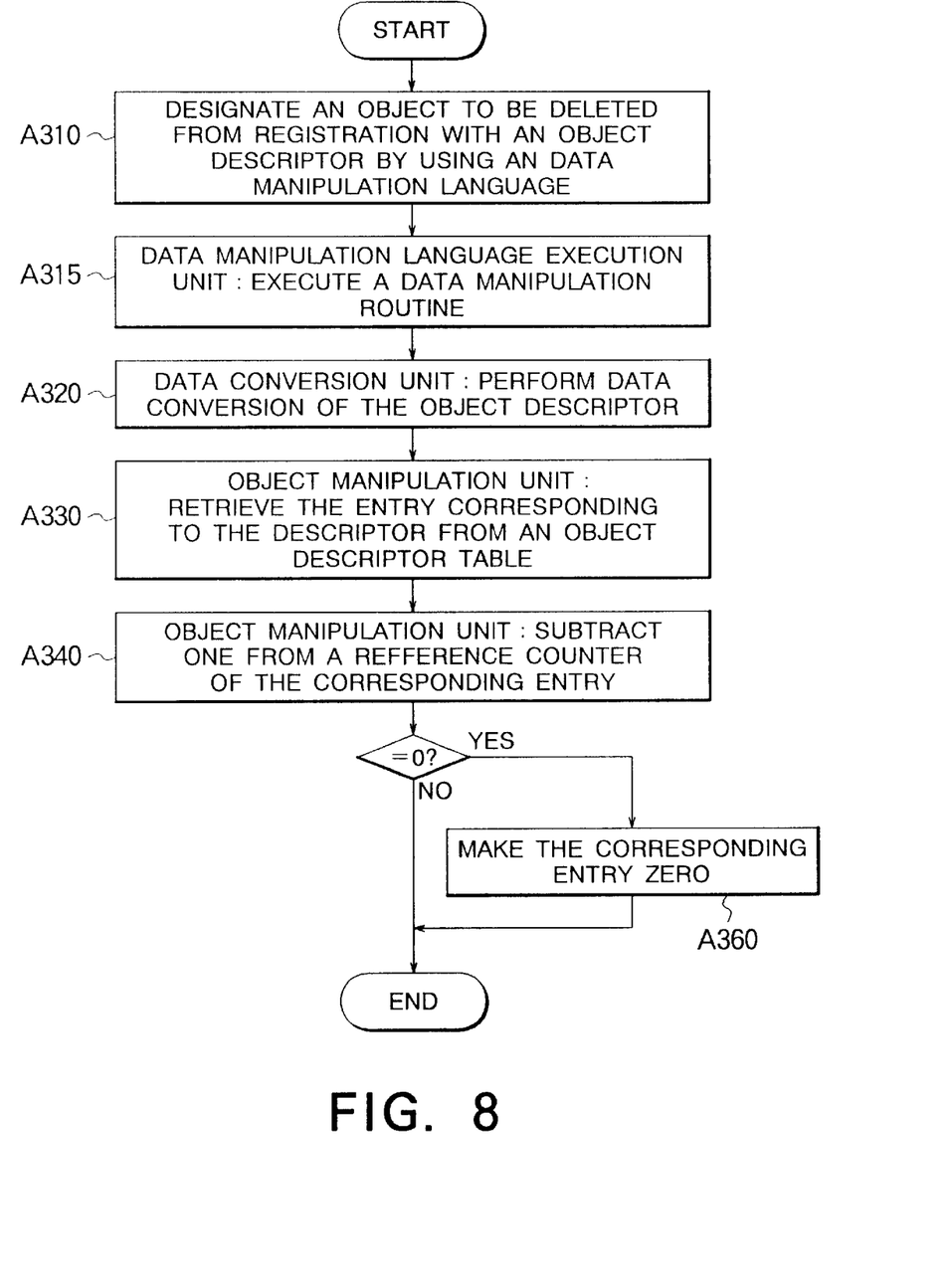
FIG. 8 is a flow chart for describing a process flow for deleting an object from the object descriptor table.

Referring to FIG. 8 in addition to FIG. 4, the size of the object descriptor table 160 is finite and the number of entries is smaller than the number of objects. Therefore, it is necessary to delete (close) objects that are not accessed explicitly in the data manipulation routine.

It will be assumed that a close description exists in the data manipulation routine written in the data manipulation language. Furthermore, it will be assumed that the close description indicates to close an object designated by the object descriptor "32" at a nineteenth step A310. At a twentieth step A315, the data manipulation language execution unit 120 interprets the close description to execute the close description. Inasmuch as the object descriptor "32" designates the object which should be closed, the data conversion unit 130 converts the object descriptor "32" into a converted object descriptor "32" having the database implementation language at a 21th step A320. The converted object descriptor is supplied to the object manipulation unit 150.

From the object descriptor table 160, the object manipulation unit 150 obtains an entry corresponding to the converted object descriptor "32" at a 22th step A330. The object manipulation unit 150 subtracts 1 from the reference count corresponding to the entry at a 23th step A340. This means that the number of users of the object designated by the entry counts one down. In case where the reference count becomes zero, the number of the users, which uses the object has the corresponding entry, becomes zero. Therefore, the corresponding entry is made to be blank at a 24th step A360. More particularly, the address field and the key field of the corresponding entry in the object descriptor table 160 are made to be blank.

Figure 9:
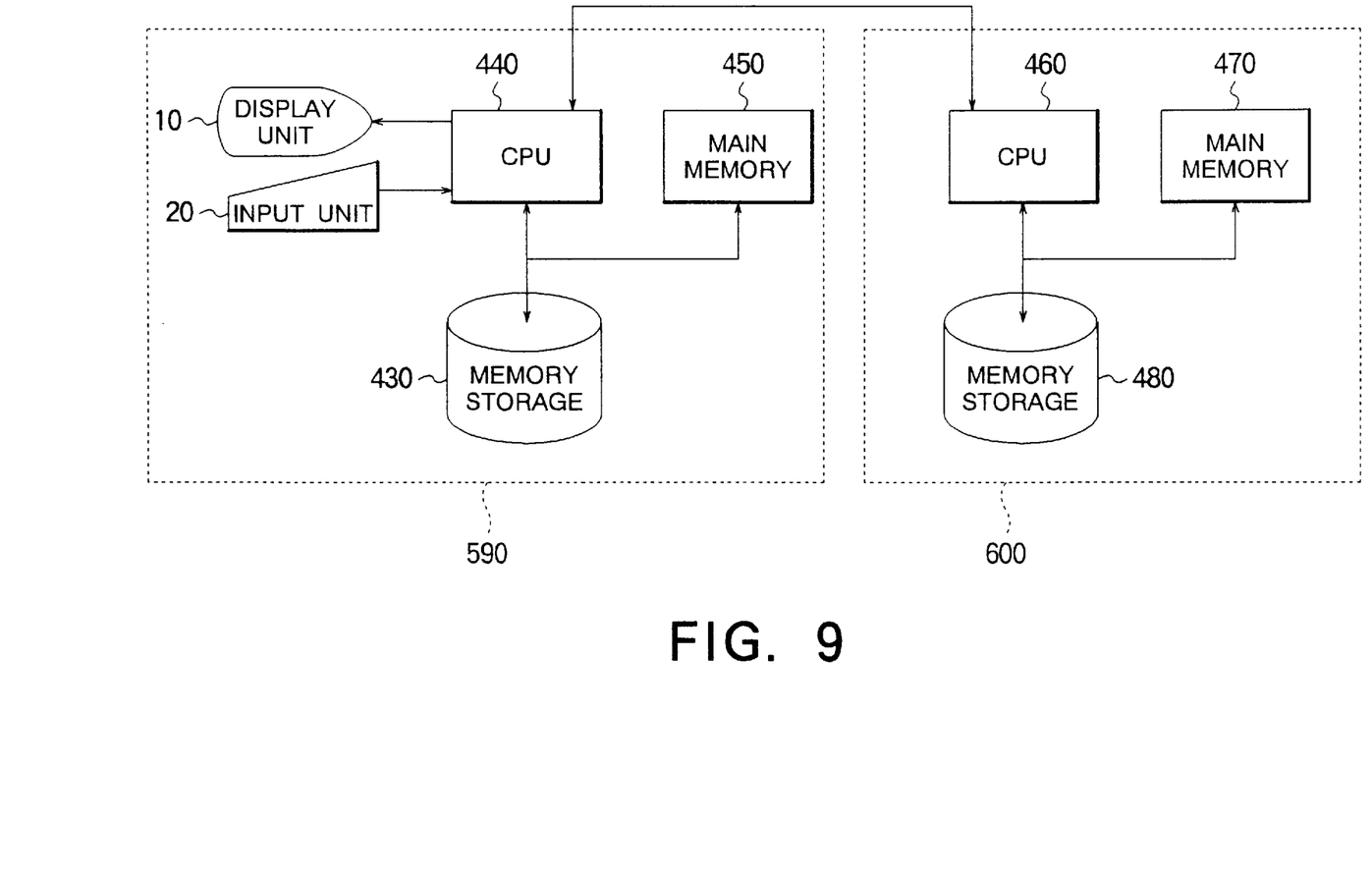
FIG. 9 is a block diagram for illustrating a device configuration to which a database access system according to a second embodiment of this invention is applicable.

Referring to FIG. 9, description will proceed to a database access system according to a second embodiment of this invention. A device configuration to which the database accesses system is applicable comprises a data manipulation computer 590 and a database computer 600. The data manipulation computer 590 is used as a client computer. The database computer 600 is used as server computer. The data manipulation computer 590 comprises the display unit 10, the input unit 20, a memory storage 430, a CPU 440, and a main memory 450. The database computer 600 comprises a CPU 460, a main memory 470, and a memory storage 480. The data manipulation computer 590 communicates with the database computer 600 through a network.

Figure 10:
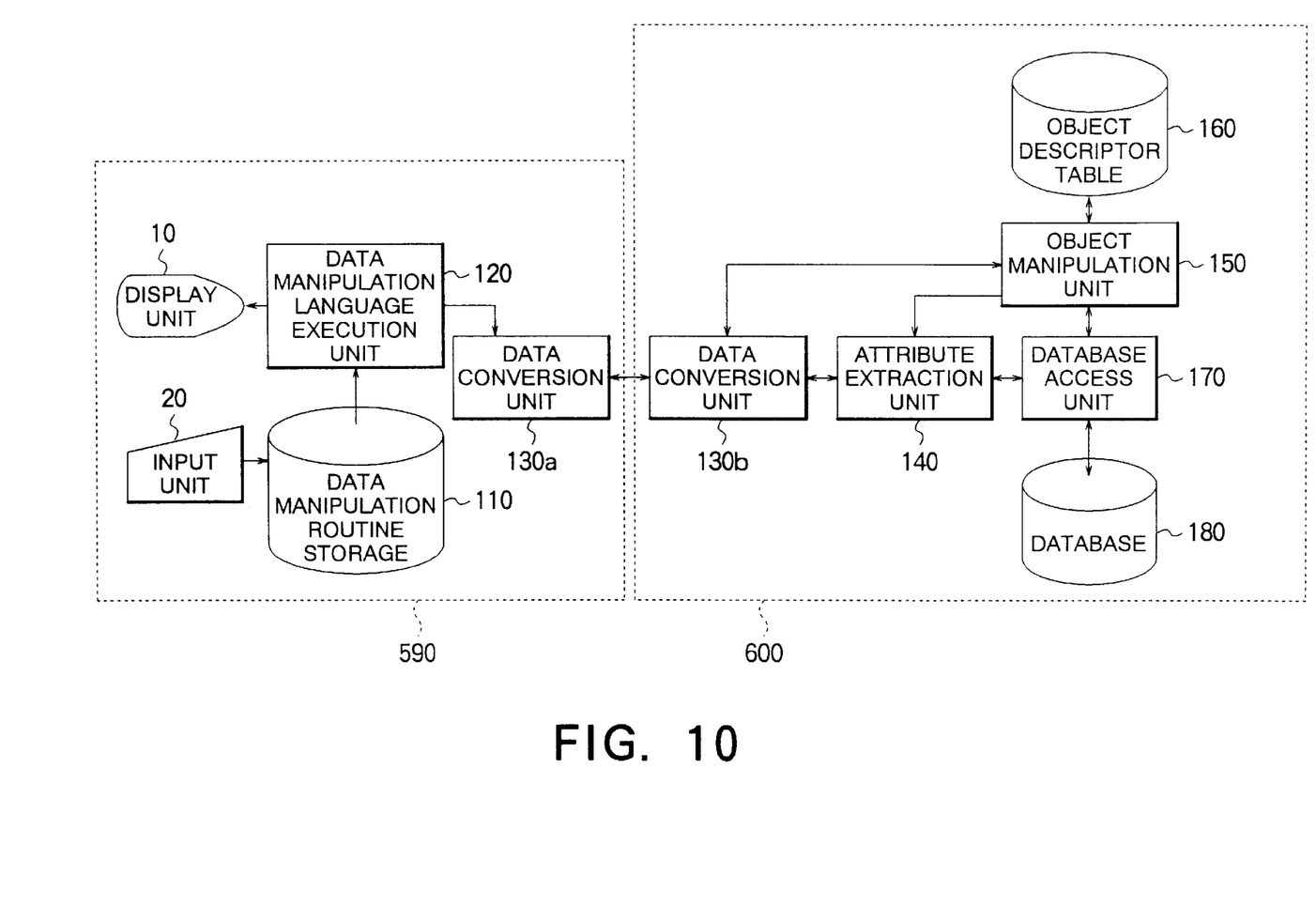
FIG. 10 is a block diagram of the database access system according to the second embodiment of this invention.

Referring to FIG. 10 in addition to FIG. 9, the data manipulation computer 590 comprises the data manipulation routine storage 110 and the data manipulation language execution unit 120 each of which is described in conjunction with FIG. 4. The data manipulation computer 590 further comprises a data conversion unit 130a. The CPU 440 serves as the data manipulation language execution unit 120 and the data conversion unit 130a. A part of memory storage 430 is used as the data manipulation routine storage 110. The database computer 600 comprises the attribute extraction unit 140, the object manipulation unit 150, the object descriptor table 160, the database access unit 170, and the database 180, all of which are described in conjunction with FIG. 4. The database computer 600 further comprises a data conversion unit 130b. The CPU 460 serves as the attribute extraction unit 140, the object manipulation unit 150, the database access unit 170, and the data conversion unit 130b. The memory storage 480 stores the object descriptor table 160 and the database 180.

In FIG. 10, the data conversion unit 130a is connected to the data conversion unit 130b through the network. The data conversion unit 130a carries out interconversion between the data of the data manipulation language and the data of network transmission. The data conversion unit 130b carries out interconversion between the data of the database implementation language and the data of network transmission.

While this invention has thus far been described in conjunction with the preferred embodiments thereof, it will readily be possible for those skilled in the art to put this invention into practice in various other manners.

What is claimed is:

1. A database access system comprising a database implementation section of a database implementation language and a data manipulation section of a data manipulation language different from said database implementation language, said database implementation section having a database which is accessed from said data manipulation section, wherein:

said data manipulation section comprises:

first means for specifying an object name as a specific object name in said data manipulation language on accessing a specific one of objects in said database;

said database implementation section comprising:

an object descriptor table for managing object descriptors;

second means for retrieving said object descriptor table in accordance with said specific object name in said database implementation language to judge whether or not a specific one of said object descriptors exists in said object descriptor table;

third means for supplying said specific object descriptor to said data manipulation section when said specific object descriptor exists in said object descriptor table; and fourth means for retrieving said database in accordance with said specific object name to obtain a specific object from said database when said specific object descriptor does not exist in said object descriptor table, said fourth means registering information of said specific object as said specific object descriptor and supplying said specific object descriptor to said data manipulation section.

2. A database access system as claimed in claim 1, wherein:

said first means specifies a particular object descriptor as a removing object descriptor in said data manipulation language on deleting a particular object designated by said removing object descriptor from said object descriptor table;

said database implementation section further comprising:
fifth means retrieving said object descriptor table in accordance with said removing object descriptor to delete a particular entry corresponding to said particular object from said object descriptor table when a reference count is equal to a predetermined count, said reference count being representative of a count at which said particular entry is referred.

3. A database access system as claimed in claim 2, wherein said predetermined count is equal to zero.

4. A database access system as claimed in claim 2, said database access system comprising first and second computers, wherein:
said first means is provided in said first computer;
each of said second through said fifth means being provided in said second computer; and
said first computer being connected to said second computer through a network.

5. A database access system as claimed in claim 1, said database access system comprising first and second computers, wherein:
said first means is provided in said first computer;
each of said second through said fourth means being provided in said second computer; and
said first computer being connected to said second computer through a network.

6. A database access system as claimed in claim 1, wherein said data manipulation section further comprises converting means for carrying out interconversion between said data manipulation language and said database implementation language.

7. A database access system as claimed in claim 1, wherein said data manipulation section further comprises converting means for carrying out interconversion between said data manipulation language and said database implementation language.

8. A database access system comprising a database implementation section of a database implementation language and a data manipulation section of a data manipulation language different from said database implementation language, said database implementation section having a database which is accessed from said data manipulation section, wherein:
said data manipulation section comprises:
first means for specifying a specific object name as a specific object descriptor in said data manipulation language on obtaining an attribute value of a specific object in said database as a specific attribute value;
said database implementation section comprising:
an object descriptor table for managing object descriptors;
second means for retrieving said object descriptor table in accordance with said specific object descriptor in said database implementation language to obtain said specific object from said database; and
third means for supplying said data manipulation section with said specific attribute value in correspondence to said specific object.

9. A database access system as claimed in claim 8, wherein:
said first means specifies a particular object descriptor as a removing object descriptor in said data manipulation language on deleting a particular object designated by said removing object descriptor from said object descriptor table;
said database implementation section further comprising:
fourth means retrieving said object descriptor table in accordance with said removing object descriptor to delete a particular entry corresponding to said particular object from said object descriptor table when a reference count is equal to a predetermined count, said reference count being representative of a count at which said particular entry is referred.

10. A database access system as claimed in claim 9, wherein said predetermined count is equal to zero.

11. A database access system as claimed in claim 9, said database access system comprising first and second computers, wherein:
said first means is provided in said first computer;
each of said second through said fourth means being provided in said second computer; and
said first computer being connected to said second computer through a network.

12. A database access system as claimed in claim 8, said database access system comprising first and second computers, wherein:
said first means is provided in said first computer;
each of said second and said third means being provided in said second computer; and
said first computer being connected to said second computer through a network.

13. A database access system comprising a database implementation section of a database implementation language and a data manipulation section of a data manipulation language different from said database implementation language, said database implementation section having a database which is accessed from said data manipulation section, wherein:
said data manipulation section comprises:
execution means for executing a routine of said manipulation language that is for obtaining a specific attribute value of said specific object, said execution means producing an object descriptor and an attribute name; and
conversion means supplied with said object descriptor and said attribute name for carrying out interconversion between said data manipulation language and said database implementation language to produce a converted object descriptor and a converted attribute name each of which has the database implementation language;
said database implementation section comprising:
an object descriptor table for managing object descriptors;
object manipulation means for retrieving said object descriptor table in response to said converted object descriptor as a key to obtain location information of said specific object;
database access means for accessing said database in accordance with said location information to obtain said specific object from said database that is registered in a location representative of said location information; and
extraction means supplied with said specific object for extracting said specific attribute value as an extracted attribute value from said specific object on the basis of said converted attribute name;
said conversion means converting said extracted attribute value into a conversion attribute value having the data manipulation language to supply said conversion attribute value to said execution means.

14. A database access system as claimed in claim 13, wherein:

said execution means executes a routine of said manipulation language that is for specifying a particular object descriptor as a removing object descriptor in said data manipulation language on deleting a particular object designated by said removing object descriptor from said object descriptor table;

said object manipulation means retrieving said object descriptor table in accordance with said removing object descriptor to delete a particular entry corresponding to said particular object from said object descriptor table when a reference count is equal to a predetermined count, said reference count being representative of a count at which said particular entry is referred.

15. A database access system as claimed in claim 14, wherein said predetermined count is equal to zero.

16. A database access system as claimed in claim 13, said database access system comprising first and second computers, wherein:
   each of said execution means and said conversion means is provided in said first computer;
   each of said object manipulation means, said database access means, and said extraction means being provided in said second computer; and
   said first computer being connected to said second computer through a network.

17. A database access system comprising a database implementation section of a database implementation language and a data manipulation section of a data manipulation language different from said database implementation language, said database implementation section having a database which is accessed from said data manipulation section, wherein:
   said data manipulation section comprises:
      execution means for executing a routine of said manipulation language that is for accessing a specific object in said database, said execution means producing an object name; and
      conversion means supplied with said object name for carrying out interconversion between said data manipulation language and said database implementation language to produce a converted object name as a key having the database implementation language;
   said database implementation section comprising:
      an object descriptor table for managing object descriptors;
      object manipulation means for retrieving said object descriptor table in response to said key to obtain an entry number of said key as an object descriptor when said key is registered in said object descriptor table; and
      database access means for retrieving said database in response to said key to obtain a location information of a specific object corresponding to said key when said key is not registered in said object descriptor table;
   said object manipulation means registering said location information in said object descriptor table;
   said conversion means converting said object descriptor into a conversion object descriptor having the data manipulation language to supply said conversion object descriptor to said execution means.

18. A database access system as claimed in claim 17, wherein:
   said execution means executes a routine of said manipulation language that is for specifying a particular object descriptor as a removing object descriptor in said data manipulation language on deleting a particular object designated by said removing object descriptor from said object descriptor table;
   said object manipulation means retrieving said object descriptor table in accordance with said removing object descriptor to delete a particular entry corresponding to said particular object from said object descriptor table when a reference count is equal to a predetermined count, said reference count being representative of a count at which said particular entry is referred.

19. A database access system as claimed in claim 18, wherein said predetermined count is equal to zero.

20. A database access system as claimed in claim 17, said database access system comprising first and second computers, wherein:
   each of said execution means and said conversion means is provided in said first computer;
   each of said object manipulation means and said database access means being provided in said second computer; and
   said first computer being connected to said second computer through a network.

21. A medium for recording a program which is for carrying out operation of a database access system comprising a database implementation section of a database implementation language and a data manipulation section of a data manipulation language different from said database implementation language, said database implementation section having a database which is accessed from said data manipulation section, said program comprising the steps of
   executing a routine of said manipulation language that is for obtaining a specific attribute value of said specific object;
   producing an object descriptor and an attribute name;
   carrying out interconversion between said data manipulation language and said database implementation language to produce a converted object descriptor and a converted attribute name each of which has database implementation language;
   retrieving said object descriptor table in response to said converted object descriptor as a key to obtain location information of said specific object;
   accessing said database in accordance with said location information to obtain said specific object from said database that is registered in a location representative of said location information;
   extracting said specific attribute value as an extracted attribute value from said specific object on the basis of said converted attribute name; and
   converting said extracted attribute value into a conversion attribute value having the data manipulation language.

22. A medium for recording a program which is for carrying out operation of a database access system comprising a database implementation section of a database implementation language and a data manipulation section of a data manipulation language different from said database implementation language, said database implementation section having a database which is accessed from said data manipulation section, said program comprising the steps of:
   executing a routine of said manipulation language that is for accessing a specific object in said database;
   producing an object name;
   carrying out interconversion between said data manipulation language and said database implementation language to produce a converted object name as a key having the database implementation language;

retrieving said object descriptor table in response to said key to obtain an entry number of said key as an object descriptor when said key is registered in said object descriptor table;

retrieving said database in response to said key to obtain a location information of a specific object corresponding to said key when said key is not registered in said object descriptor table;

registering said location information in said object descriptor table; and converting said object descriptor into a conversion object descriptor having the data manipulation language.

* * * * *